United States Patent Office 3,302,688
Patented Feb. 7, 1967

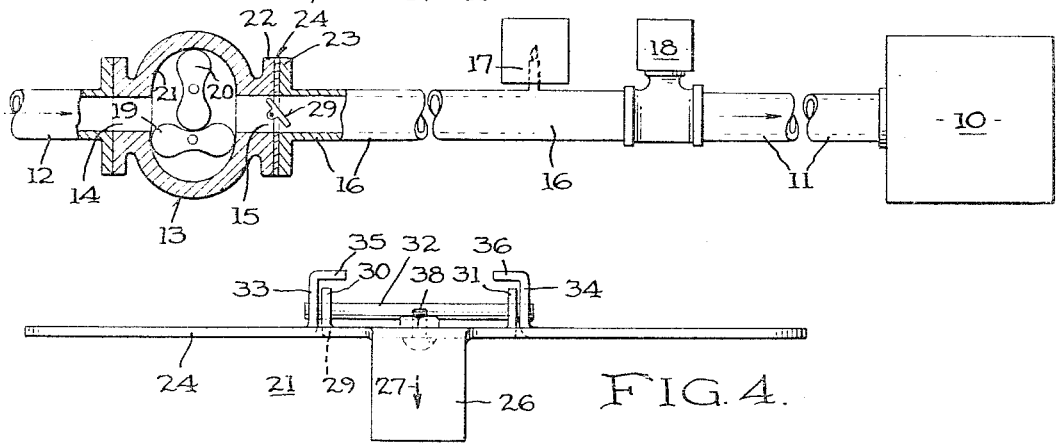
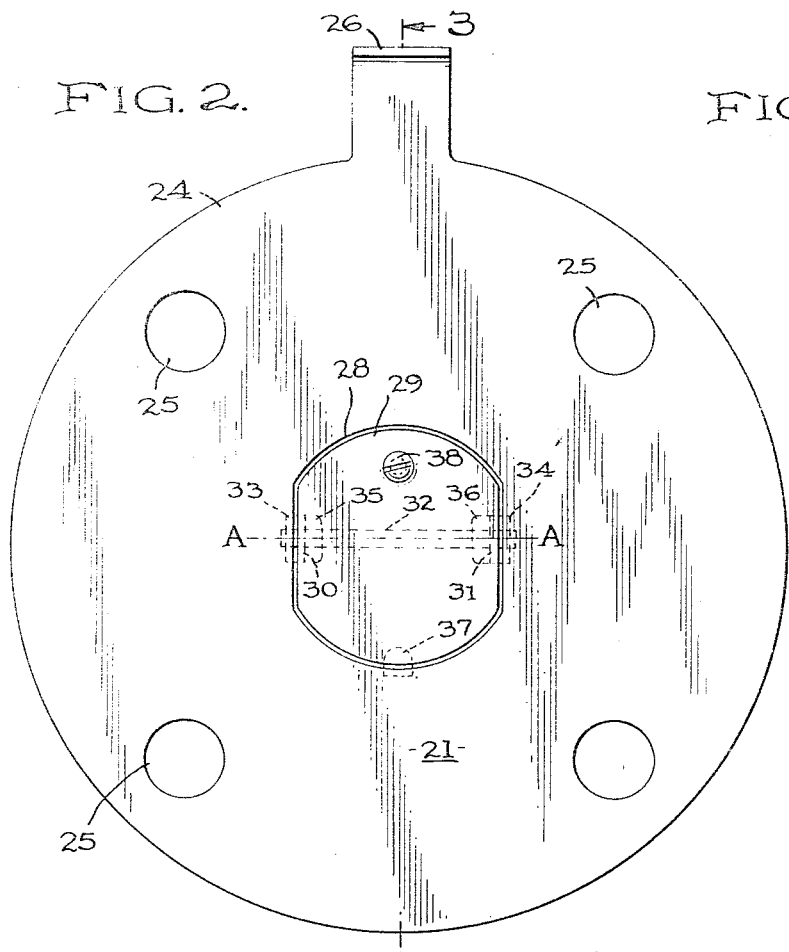
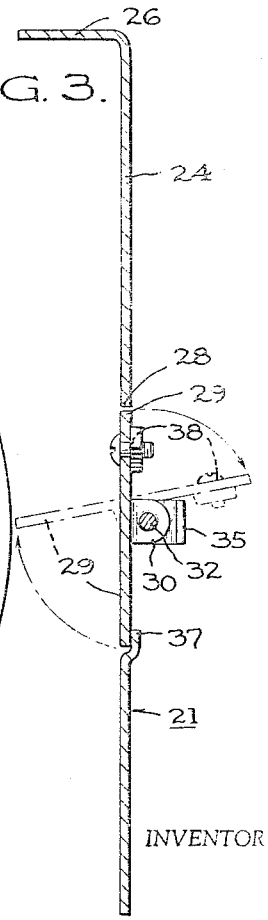
Feb. 7, 1967     J. E. THRUSH     3,302,688
GAS METERING AND BURNER SYSTEM WITH MEANS
FOR PREVENTING BACKFLOW
Filed Aug. 19, 1965
INVENTOR
JAMES E. THRUSH
BY
Cameron, Kerkam & Sutton
ATTORNEYS

3,302,688
GAS METERING AND BURNER SYSTEM WITH
MEANS FOR PREVENTING BACKFLOW
James E. Thrush, Peoria, Ill., assignor to Dressser Industries, Inc., Dallas, Tex., a corporation of Delaware
Filed Aug. 19, 1965, Ser. No. 480,915
8 Claims. (Cl. 158—115)

The present invention relates to gas metering systems, and more particularly to a low pressure gas metering system embodying means for preventing backward flow of the gas through a meter located in the gas supply line upon shutoff of the gas demand at a gas consuming appliance connected to the line.

In low pressure gas systems, a serious problem occurs from an over-run condition which exists when rotary positive displacement gas meters are used to meter the flow of gas through lines which supply both large gas consuming appliances and other smaller appliances, particularly pilot lights, which are not intended to be shut off simultaneously with the large appliances. In such systems, there is generally provided a fast-acting flow shutoff valve in the supply line leading to the large gas consuming appliance to effect a rapid cutoff of the gas supply to the latter whenever the need for operation thereof ceases. However, because of their inertia the rotors of the meter continue to turn for several revolutions after the shutoff valve has closed. This inertia causes a downstream pressure build-up which results in an expansion of the gas and a backward surge through the meter, bringing about undesirable pressure fluctuations and counter-rotation of the meter rotors. Counter-rotation of the rotors in turn tends to evacuate the downstream line and frequently results in extinction of the pilot light or other smaller appliance, thereby creating a serious safety hazard.

Various attempts have been made heretofore to correct this situation such as, for example, the provision of mechanical attachments to the meter rotors to prevent counter-rotation thereof, and the use of differential pressure devices or standard check valves in the downstream line. However, such attempted solutions of the problem suffer from various disadvantages in that they either involve structural modification of and introduction of undesirable stresses into the meter components, require a high actuating energy, or are difficult to adapt to existing metering systems.

Accordingly, it is the primary object of the present invention to provide an improved low pressure gas metering system embodying a rotary positive displacement meter and means for preventing counter-rotation of the meter rotors and consequent evacuation of the downstream portion of the line upon shutoff of the gas supply to a gas consuming appliance.

Another object is to provide a low pressure gas metering system with a structurally simple, readily installed valve which is held open during normal flow conditions in the supply line with a minimum loss of energy, and which is automatically and instantaneously closed whenever the downstream flow of gas is shut off.

Other objects and advantages of the invention will appear more fully from the following detailed description of the mechanical structure and mode of operation of one form of metering system embodying the inventive concept. While the specification concludes with claims particularly pointing out and distinctly claiming the subject matter of the present invention, it will be described with reference to the accompanying drawings; however, it is to be expressly understood that these drawings are for the purpose of illustration only and are not intended to represent the full scope of the invention which is defined by the appended claims.

In the drawings, wherein like reference characters indicate like parts throughout the several views:

FIG. 1 is a diagrammatic view, partly in cross section, of one form of metering system embodying the present invention;

FIG. 2 is a front elevational view of the backflow preventing flapper valve incorporated in the metering system of FIG. 1;

FIG. 3 is a vertical sectional view taken along line 3—3 in FIG. 2; and

FIG. 4 is a plan view of the valve of FIG. 2.

Referring now to the drawings, and in particular to FIG. 1, reference numeral 10 designates the gas consuming burner of any usual large demand gas appliance, while 11 indicates the supply line by which low pressure gas is supplied to the burner from any suitable source, such as a municipal gas main, through pipe 12. The amount of gas consumed is metered by a rotary positive displacement meter 13 having its inlet 14 connected to the pipe 12 and its outlet 15 connected to a pipe 16. For convenience, the inlet 14 and outlet 15 may be referred to herein as being connected to the upstream and downstream sides, respectively, of the supply line.

Meter 13 is of a well-known type comprising a pair of multi-lobe, intermeshing rotors 19 and 20 which are rotatably mounted within a casing 21 and geared together so that a certain definite volume of gas, which furnishes the torque for turning the rotors, is entrapped between the lobes of the rotors and advances through the meter upon each rotation of the rotors. The volume of gas passing through the meter is measured and recorded by a suitable counter (not shown) arranged to be driven from one of the rotor shafts in a manner well known in the art.

Situated in the downstream side of the supply line, connected to pipe 16, is a gas consuming appliance 17 having a consumption rate which is small relative to the consumption of the burner 10, and which is adapted to remain in operation when the flow of gas to burner 10 is shut off. In the system illustrated in FIG. 1, appliance 17 is a pilot light. Intermediate the pilot light 17 and main burner 10 is a fast-acting flow shutoff valve 18 of any suitable type, such as the many well-known forms of thermoelectrically controlled valve available on the market. As can be readily appreciated, since the gas flow to the burner 10 is large in relation to the flow to the pilot light 17, the speed of rotation of the rotors of the meter 13 is primarily controlled by the demand of the larger gas consuming appliance.

Thus far, there has been described a conventional gas metering system which is subject to an undesirable downstream pressure build-up upon closure of the fast-acting valve 18, and to a consequent backward flow or surge of gas which causes counter-rotation of the meter rotors and starvation of the smaller gas consuming pilot light 17. These and other disadvantages are overcome by inclusion in the system of the present invention of a flap type valve 21 of unique construction which is supported between the mating flanges 22 and 23 of the meter casing 21 and pipe 16, respectively.

As shown on an enlarged scale in FIGS. 2–4, the stationary portion of valve 21 comprises a thin supporting disc 24, the peripheral dimension of which corresponds to that of the flanges 22 and 23, and which is provided with a plurality of spaced bolt receiving holes 25 to facilitate mounting between the flanges in a vertical position. The top portion of the disc 24 is provided with an inverted L-shaped extension 26 the horizontal portion of which is marked with an arrow or other suitable indicia 27 to identify the proper direction of placement of the valve during installation. Disc 24 is preferably made as thin as possible, while still providing the necessary supporting strength and rigidity; for example, a disc of 16 gauge steel has been found satisfactory.

The center of disc 24 is cut out to form an opening 28 of approximately the same diameter as the interior of supply pipe 16. Supported in this opening is a wafer-like disc or flapper 29 which is free to rotate about a horizontal axis between an open and closed position. Flapper 29 is preferably constructed of a lightweight material, such as aluminum, in order to require only a low actuating energy for operation and thereby avoid an excessive pressure loss. The outer dimensions of flapper 29 are such as to provide a small operating clearance between the flapper and the edges of the disc 24 defining the opening 28 which permits free movement of the flapper between its open and closed positions, and which also permits normal pressure to be maintained without danger of counter-rotation of the meter rotors when the flapper valve is closed.

To enable rotation of the flapper 29 between its open and closed positions, it is provided with a pair of laterally projecting bearing bosses 30 and 31 which are so positioned that their axis of rotation A—A is offset slightly above a horizonal plane passing through the center of the flapper. Bearing bosses 30 and 31 are rotatably mounted on a shaft or roll pin 32 the ends of which are supported in a pair of L-shaped bracket members 33 and 34 formed integrally with and extending perpendicularly to disc 24 in an upstream direction. The outer portions 35 and 36 of members 33 and 34, respectively, are bent inwardly toward one another to form stops which limit the rotation of flapper 29, as it swings to its fully open position (shown in broken lines in FIG. 3), to slightly less than 90°. The disc 24 is also provided with a stop 37 which extends upwardly from the lower edge of opening 28 in a position such as to limit the return movement of flapper 29 and maintain it coplaner with disc 24 when the valve is in its closed position. The upper portion of the flapper is provided with a suitable counterbalancing weight 38, which may be in the form of a nut and bolt arrangement as shown, for facilitating movement of the flapper with a minimum loss of pressure during normal flow conditions.

During normal operation of the system, gas is supplied continuously to the pilot light 17, but is supplied to main burner 10 only when valve 18 is open. It will therefore be understood that the flapper 29 of valve 21 is so supported and counterweighted that even the relatively small flow of gas to the pilot light produces sufficient pressure on the flapper to move it to open position. All of the gas consumed by the pilot light 17 and burner 10 is measured as it passes through meter 13, and flapper 29 is maintained in open position as long as any gas is flowing through the meter.

When the demand for heat from burner 10 ceases, valve 18 closes automatically and rapidly, but the inertia of the meter rotors causes them to continue to turn for several revolutions, resulting in a build-up of the gas pressure in pipe 16 downstream of the meter. The increased pressure acts against the larger area of flapper 29 which lies on the side of axis A—A opposite counterweight 38, and quickly rotates the flapper to its closed, vertical position in engagement with stop 37, thus shutting off the meter from the downstream pressure and preventing any reverse rotation of the meter rotors and consequent evacuation of the downstream line which might extinguish pilot light 17. The increased pressure in the pipe 16 is gradually dissipated by the burning pilot light, and, as soon as the pressure drops below the pressure within the meter casing 21, the flapper valve again opens to permit a normal supply of gas to pilot light 17 and to prepare the system to meet the demand of burner 10 whenever valve 18 is opened.

There is thus provided by the present invention a simple and yet effective means for counteracting the effect of inertia-caused override of the rotating elements of a rotary positive displacement meter in a low pressure gas metering system so as to prevent counter-rotation of the rotors and evacuation of the downstream line. The flapper valve construction of the present invention provides an arrangement which is mechanically detached from the meter, is easily installed in existing piping installations, and requires a low actuating energy so that minimum pressure losses occur during normal operation.

Althought only one specific embodiment of the invention has been described and illustrated, it will be obvious to those skilled in the art that various modifications may be made therein. It is therefore intended by the appended claims to cover all such modifications which fall within the true scope of the invention.

What is claimed is:

1. A low pressure gas metering system comprising in combination a gas supply line adapted to receive gas under pressure, a rotary positive displacement meter having an inlet and an outlet and a pair of rotatably mounted intermeshing rotors adapted to be rotatably driven by the gas for metering the flow of gas from the gas supply line, said inlet being connected to said supply line, a downstream gas supply pipe connected to said meter outlet, a first and a second gas consuming appliance connected to said downstream pipe, said second appliance being downstream of said first appliance, a fast-acting valve for controlling the flow of gas to said second appliance, said second appliance having a gas consumption rate greater than that of said first appliance, and a flapper valve mounted between said meter outlet and said downstream pipe, said flapper valve being arranged for automatic rotational movement between an open and a closed position, said flapper valve being rotatable to its open position in response to normal gas flow through said meter and to its closed position in response to a pressure build-up in said downstream pipe due to closure of said fast-acting valve to prevent counter rotation of said rotors and evacuation of the downstream pipe.

2. A low pressure gas metering system as set forth in claim 1 wherein said flapper valve comprises a supporting disc mounted between said meter outlet and said downstream pipe, said supporting disc having a central opening therein, and a lightweight flapper element rotatably supported by said disc in said opening.

3. A low pressure gas metering system set forth in claim 2 including stop means on said supporting disc for limiting the rotation of said flapper element to slightly less than 90°.

4. A low pressure gas metering system comprising in combination a gas supply line adapted to be connected to a source of low pressure gas, a rotary positive displacement meter having an inlet and an outlet and a pair of rotatably mounted intermeshing rotors adapted to be rotatably driven by the gas for metering the flow of gas from said gas supply line, said inlet being connected to said gas supply line, a downstream gas supply pipe connected to said meter outlet, a first and a second gas consuming appliance connected to said downstream pipe, said second appliance being downstream of said first appliance, a fast-acting shutoff valve for controlling the flow of gas to said second appliance, said second appliance having a gas consumption rate greater than that of said first appliance, a flapper valve mounted between said meter outlet and said downstream pipe, said flapper valve including a rigid supporting disc having a central opening therein of approximately the same diameter as the interior of said downstream pipe, a flapper element rotatably supported by said disc in opening, said flapper element being rotatable to an open position in response to normal gas flow through said meter and to a closed postiion in response to a pressure build-up in said downstream pipe due to closure of said fast-acting valve, to prevent counter rotation of said rotors and evacuation of the downstream pipe, first stop means on said disc for limiting the rotation of said flapper element toward open position to less than 90°, and second stop means on said disc for stopping said flapper element in closed position in response to said downstream pressure build-up.

5. A low pressure gas metering system as set forth in claim 4 further including a shaft supported to said disc, said flapper element including a pair of projecting bosses rotatably supported on said shaft and having an axis of rotation offset above a horizontal plane passing through the center of the flapper element for rotatably supporting said flapper element.

6. A low pressure gas metering system as set forth in claim 5 further including stop means on said supporting disc for limiting the rotation of said flapper element to slightly less than 90°, said stop means comprising a pair of spaced members projecting from said supporting disc and adapted to support said shaft, a portion of each of said spaced member being turned inwardly toward one another.

7. A low pressure gas metering as set forth in claim 5 wherein said flapper element includes a counter-balancing weight mounted thereto above said axis of rotation of said projecting bosses for facilitating movement of the flapper element with a minimum loss of pressure during normal flow conditions through said gass supply pipe.

8. A low pressure gas metering system as set forth in claim 4 wherein said first stop means includes a pair of spaced members projecting from said disc, each having a portion turned inwardly toward one another and further including a pair of bosses projecting from said flapper element, a shaft extending between said pair of spaced members and supported thereto, said bosses being rotatably mounted on said shaft for rotatably supporting said flapper element.

References Cited by the Examiner
UNITED STATES PATENTS

| | | | |
|---|---|---|---|
| 1,285,220 | 11/1918 | Kerstein | 73—276 |
| 1,469,216 | 10/1923 | Fardy | 72—276 |
| 2,016,234 | 10/1935 | Hughes. | |

JAMES W. WESTHAVER, *Primary Examiner.*